May 12, 1931. H. VITTINGHOFF 1,805,118
MAXIMUM DEMAND GAS METER
Filed June 16, 1926 3 Sheets-Sheet 1

Inventor.
Hans Vittinghoff
atty

May 12, 1931.  H. VITTINGHOFF  1,805,118
MAXIMUM DEMAND GAS METER
Filed June 16, 1926   3 Sheets-Sheet 2

Inventor.
Hans Vittinghoff
by

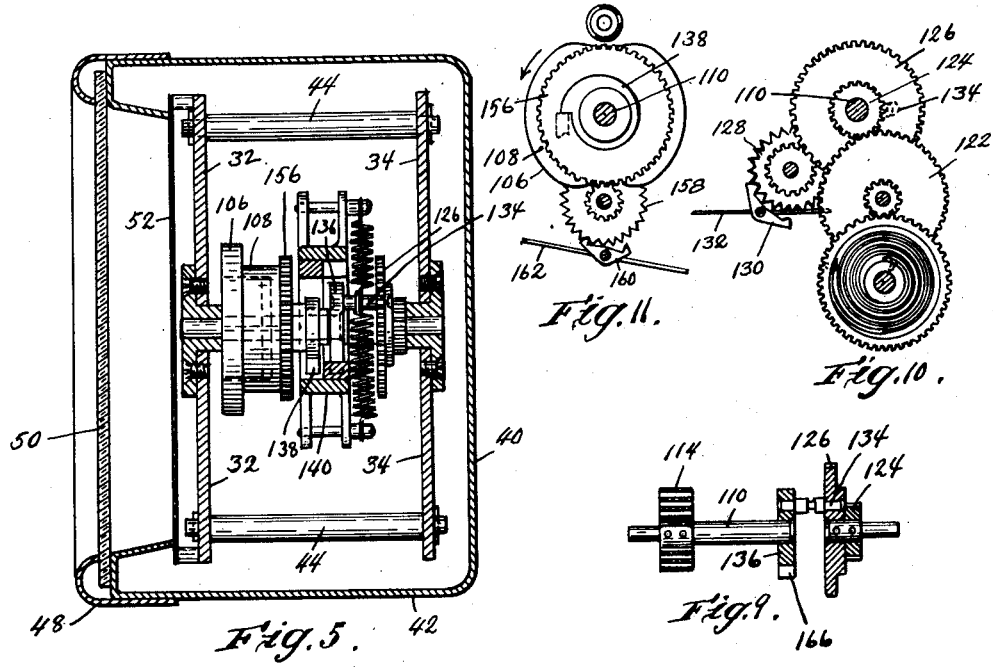
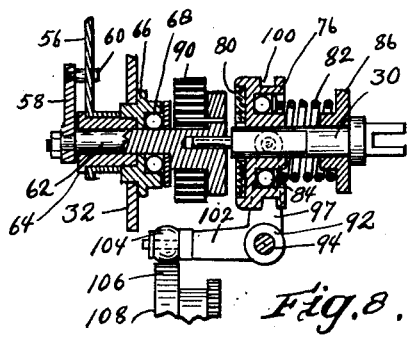

Patented May 12, 1931

1,805,118

UNITED STATES PATENT OFFICE

HANS VITTINGHOFF, OF WINCHESTER, MASSACHUSETTS, ASSIGNOR, BY MESNE ASSIGNMENTS, TO STONE & WEBSTER, INCORPORATED, A CORPORATION OF DELAWARE

MAXIMUM DEMAND GAS METER

Application filed June 16, 1926. Serial No. 116,457.

This invention relates to metering devices and has particular reference to devices for metering the maximum amount of gas that is used during a predetermined period of time.

The gas making and gas storage capacity of a gas plant depends upon the maximum demand for gas upon the plant. The demand for gas by any customer influences the cost of gas to the customer and the demand for gas by the customer in any specified interval of time also influences the cost of gas to the customer. It is, therefore, highly desirable to know at what rate a customer uses gas during any part of the day or other suitable length of time and also to know the maximum amount of gas used at any shorter interval during this predetermined longer period. An object of this invention therefor is the provision of a maximum demand meter which will indicate the maximum amount of gas utilized in any relatively small interval of time covering a longer period of time. For practical purposes, the device embodying the invention is arranged to indicate the maximum amount of gas utilized in any fifteen minute period of a longer period of a month, or between meter readings.

A further object of the invention is the provision of a maximum demand mechanism which is complete as an attachment and is adapted to be applied with little trouble to existing indicating gas meters.

A further object of the invention is generally to improve the construction and operation of maximum demand gas meters.

Fig. 5 is a section along line 5—5 of Fig. 4.

Fig. 8 is a detail of the clutch mechanism illustrated in Fig. 4 with the clutch in disengaged position.

Fig. 9 is a detail of the crank shaft which operates the clutch operating mechanism.

Fig. 10 is a detail illustrating a clock-gear for driving a drive shaft.

Fig. 11 is a sectional detail along line 11—11 of Fig. 4 and illustrating more particularly the timing escapement for the clutch operating drum.

Figure 1:
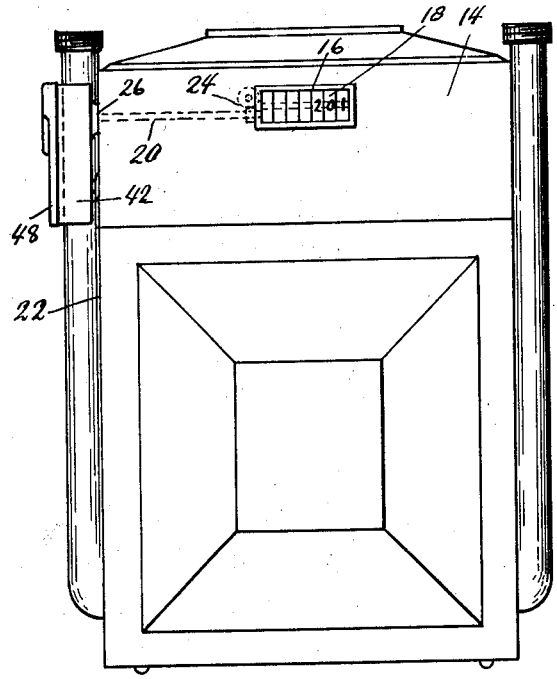
Fig. 1 is a front elevation of a gas meter to which is applied the maximum demand mechanism embodying my invention.
Figure 2:
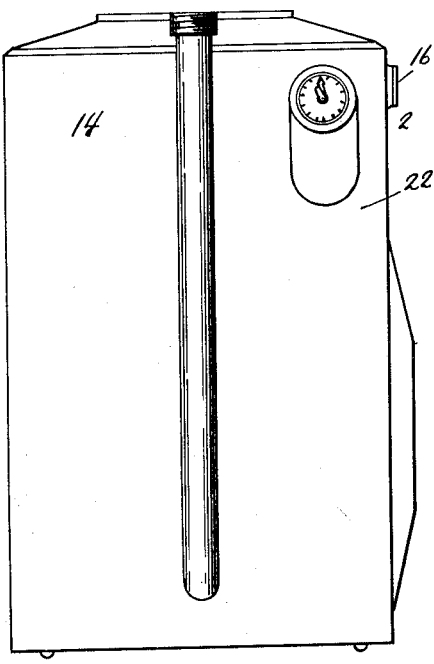
Fig. 2 is a side elevation of Fig. 1.

The indicating gas meter to which my invention is adapted to be applied comprises a casing 14 which has a window 16 in the upper part thereof through which the indicating dials 18 are exposed. In accordance with this invention, I provide a shaft 20 which is extended through a side wall 22 of the meter casing and is connected through suitable gears 24 with the shaft that rotates the indicating dials 18. Said shaft 20 is extended outwardly through said side wall 22 and through a suitable packing member or gas seal 26. The outer end of said shaft is provided with a tongue 28 which is adapted to make a detachable connection with the indicator drive shaft 30 of the maximum demand mechanism incorporating the invention.

The maximum demand mechanism comprises a supporting frame including a pair of vertically-spaced supporting-plates 32 and 34 on and between which the components of the mechanism are carried. Said plates and associated mechanisms are attached to the side wall 22 of the meter casing by suitable means as a bolt 36 which passes through said plates and is screw-threaded into a boss 38 which is adapted to be attached to the side wall of the meter casing. The demand mechanism is provided with an enclosing casing comprising a rear wall 40 and an integral side wall 42, which casing is secured to the mechanism frame by pins 44, which pins serve to connect and space apart said plates 32 and 34. The rear wall 40 of said casing is provided with an open neck 46 at the upper portion thereof, which neck surrounds the extended end of said drive shaft and encloses and conceals said drive shaft against promiscuous tampering therewith. The open front of said casing is closed by a removable cover 48, which cover is adapted to be locked in place in any suitable manner and to be unlocked only by some authorized person. Said cover 48 is provided with a window 50 at the upper portion thereof through which a dial 52 is exposed. Said dial 52 is secured to said front supporting plate 32 in any suitable manner as by means of screws 54. An indicating hand 56 is pivotally supported in position to travel over the face of said dial. Said hand is adapted to be advanced in one direction by means of an arm 58 which carries a pin 60 that is adapted to bear loosely against said hand 56. Said arm 58 is adapted to be rotated in a clockwise direction by the meter shaft 20. Means are provided to disconnect said arm from said meter shaft at the expiration of predetermined time periods and to return said arm to its original position and then to reconnect it with said shaft. As here shown, the mechanism is adapted to return said arm to its initial position every fifteen minutes. The hand 56 is adapted to be held by friction in the most advanced position to which it has been moved, thereby to indicate the maximum demand for gas in any interval.

Said disconnecting means includes clutch mechanism which comprises a driven shaft 62 to the outer end of which said arm 58 is secured. Said shaft is journalled in a bushing 64 which is screw-threaded in the casing 66 of a thrust ball-bearing 68; and said casing 66 is fixed to the front plate 32. Said hand 56 is rotatable on said bushing 64 and is in frictional engagement therewith. Said driven shaft 62 is formed with an axial recess 70 in its inner end in which the reduced end 72 of a driving clutch-shaft 30 is journalled, whereby to hold said shafts 62 and 30 in alignment. Said shaft 62 is provided with a radially outstanding flange 74 at its inner end which forms one of the friction clutch elements. The driving shaft 30 is provided with a clutch element comprising a drum 76 which is slidable on said shaft 30 but is prevented from independent rotation thereon by suitable means not necessarily described.

The radial front face of said drum 76 may be faced with a friction disc 80 of rubber or other suitable material. Said drum is adapted to be pressed into normal driving engagement with the face of the flange 74 of the driven shaft 62 by a compression spring 82 which bears at one end against a thrust ball-bearing 84 carried internally by said drum 76 and at the other end against a collar 86 carried by the drive shaft 30 and supported against axial movement thereon by an outstanding flange 88 of said drive shaft.

Figure 4:
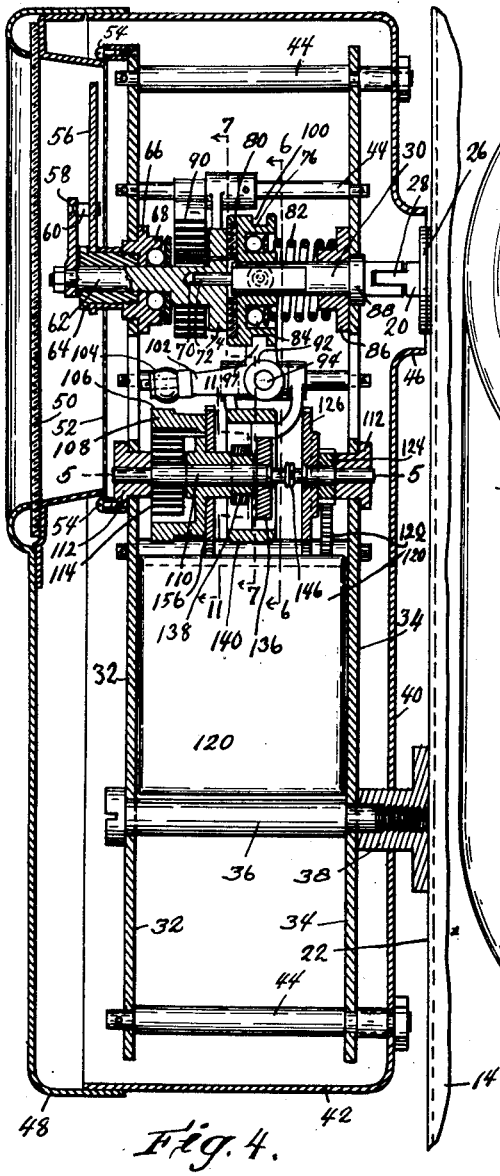
Fig. 4 is a section along line 4—4 of Fig. 3.
Figure 3:
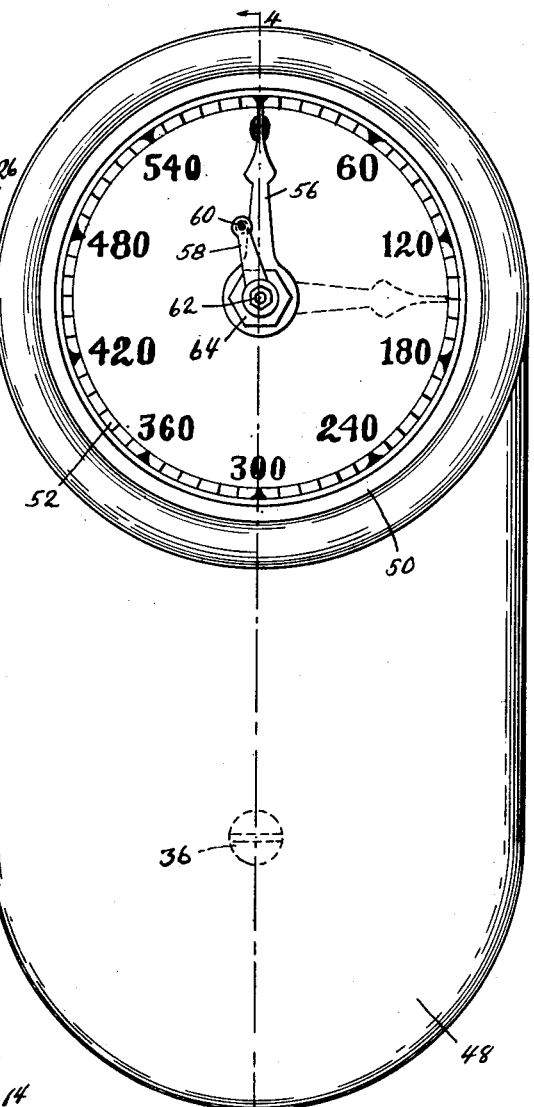
Fig. 3 is an enlarged front elevation of the demand mechanism illustrated in Fig. 2.

As thus arranged, when the clutch is engaged as shown in Fig. 4, the arm 58 is in driving connection with the meter shaft 20 and, consequently, is adapted to move the arm 56 over the dial. At the expiration of a fifteen minute period the clutch is adapted to be retracted into a position shown in Fig. 8 to permit the arm 58 to be returned to its initial position. The arm 58 is returned to its initial position by means of a spiral spring 90, the inner end of which is fixed to said shaft 62 and the outer end of which is fixed to an upper one of said pins 44. The arrangement is such that rotation of said shaft 62 under the action of the meter mechanism serves to stress said spring which, when the clutch is disengaged, effects the rapid return of the arm 58 to its initial position.

Figure 6:
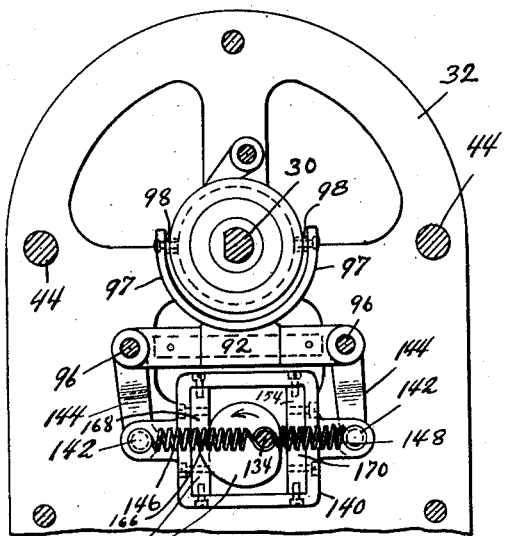
Fig. 6 is a section along line 6—6 of Fig. 4.

Clutch-actuating mechanism is provided to operate the clutch at the expiration of each fifteen minute interval whereby to permit said arm 58 to return to its initial position and thereupon to re-connect said arm with the meter shaft 20. Said actuating means includes a bifurcated member 92 which is pivotally mounted below said clutch drum 76 on a shaft 94, which shaft is extended between and is supported by a pair of spacer pins 96 (Fig. 6) connecting said plates 32 and 34. The arms 97 of said bifurcated member 92 are extended upwardly on opposite sides of said clutch member 76 and are provided with pin-supported rollers 98 which are disposed loosely in an annular groove 100 (Fig. 4) formed in the periphery of said clutch drum. Said bifurcated member 92 is provided with a forwardly-extended arm 102 on the outer end of which a spherically-shaped roller 104 is journalled. Said roller 104 is adapted to be engaged by the cam face 106 formed on the periphery of a cam-drum 108, whereby to effect the raising and lowering of said arm 102 and, consequently, the operation of the clutch. Said cam-drum 108 is loosely mounted on a crank shaft 110 which is journalled in bushings 112 carried by the supporting plates 32 and 34. Said drum 108 is connected to said crank shaft 110 by means of a spiral drum-driving spring 114 which is disposed within a recess within said drum. The inner end of said spring is fixed to said shaft and the outer end thereof is attached to said drum. Said shaft 110 is adapted to be continually rotated while said drum is maintained against rotation during the major extent of the fifteen minute periods, and, during this period of rest, said shaft is adapted to wind up said spring. At the expiration of each fifteen minute period said drum is adapted to be released for rotation and said spring is adapted to rotate said drum through 180° and thereby to effect the release and re-engagement of the clutch mechanism.

Said cam-drum is provided with holding and releasing means which is arranged normally to hold the drum stationary and to release it at the expiration of a fifteen minute period, or thereabouts, and permit it to rotate throughout 180°, to actuate the clutch mechanism, and to again hold it against rotation throughout a second time-period. Said holding and releasing means includes said crank shaft 110 and associated mechanism. Said crank shaft 110 is adapted to be driven continuously by a suitable clock mechanism 120. The clock mechanism may include a gear train 122, see Fig. 10, which meshes with the gear 124 fixed to the crank shaft 110. The crank shaft is provided with a gear 126 which forms one of the cheek plates of the crank shaft and said gear is arranged to drive a timing mechanism including a ratchet wheel 128, pawl 130 and associated fan 132 which serves to govern the speed of rotation of the crank shaft and to cause it to rotate at a uniform speed. The clock mechanism, however, may be constructed with a speed-governed gear train 122, in any common manner, in which case the gear 126 and associated speed-governing mechanism is not necessary.

Figure 7:
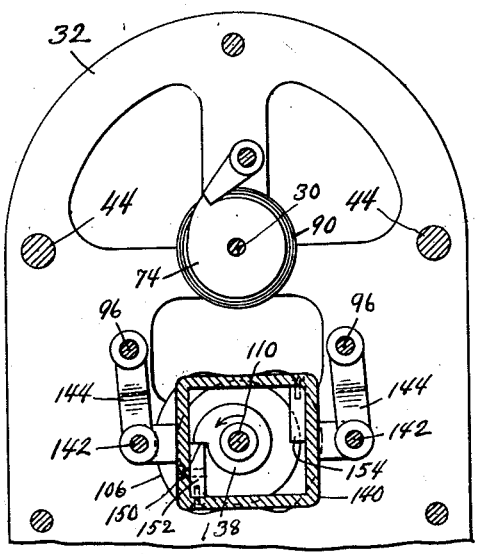
Fig. 7 is a section along line 7—7 of Fig. 4.

The crank shaft is provided with a crank pin 134 (Fig. 9) which is carried by the gear 126 and also by a stepped cam 136, which cam forms the other cheek plate of the crank shaft. A second stepped cam 138 is carried by and fixed to the hub of said clutch-operating drum 108 in line with said cam 138. Said cams are enclosed within a shiftable cam-frame 140, (Figs. 4, 6 and 7) which frame is supported at its ends by links 144 and is pivoted to said links by pins 142. The upper ends of said links are bifurcated and the bifurcated ends are pivoted on said pins 96. The pivotal supports for said frame 140 are such that said frame can reciprocate to the right and left, see Figs. 6 and 7, in parallel lines. A tensile spring 146 is connected to the crank pin 134 and to the left hand pivot pin 142. A second tensile spring 148 is connected to said crank pin and to the right hand pin 142. The function of said springs and the crank shaft is to cause said frame 140 to move rapidly to the right or left when released for such movement by the crank shaft cam 136 and thereby to effect the rapid release of said drum 108 for rotation. The cam 138 associated with the clutch operating drum 108 is provided with a spiral face and a step 150 which is adapted to engage alternately with the end faces of upper and lower abutment plates 152 and 154 respectively, which plates are carried by opposite end walls of the frame 140, see Fig. 7. When said frame is moved toward the left, Fig. 7, the lower abutment plate 152 is moved from under holding position with the cam 138. The spring 114 associated with the drum 108 thereby serves to rotate said cam counter-clockwise. The movement of the frame 140 which effects the release of said cam 138 also serves to position the upper abutment plate 154 in the path of movement of said cam so that said cam is permitted to rotate only throughout 180°, during which period of operation said drum 108 serves to raise and lower the arm 102 thereby to effect the momentary disengagement of the clutch.

The drum 108 is provided with timing mechanism so arranged as to effect the rotation of the drum in a period of two seconds, although this interval may be modified to suit a specific condition. Said timing mechanism includes a gear 156 carried by said drum 108, see Figs. 4 and 11. Said gear is arranged to drive a ratchet wheel 158 and a pawl 160 and fan 162 associated with said pawl, thereby to govern the speed of rotation of said cam 108.

The movements of said frame 140 are controlled by the cam 136 carried by the cam shaft. Said cam 136 is similar to said cam 138 and is provided with a spiral face which terminates in a step 166. Said frame 140 is provided with a second pair of upper and lower opposed abutment plates 168 and 170 respectively, which plates are disposed in line with said cam 136. The arrangement is such that as said cam rotates in a counter-clockwise direction from, say, the position illustrated in Fig. 6, the step 166 leaves the abutment 168. The spring 146 is under tension and tends to move the frame 140 toward the right, but such movement is prevented by engagement of the frame with the face of the cam 138. The rotation of the crank shaft in a counter-clockwise direction from the position shown serves to relieve the stress on the spring 146 and to place spring 148 under tension. The frame consequently tends to move towards the left. Such movement is prevented, however, by engagement of the cam 136 with the lower abutment plate 170. When, however, said cam has been rotated 180°, its step 166 slips over the top face of the abutment plate 170; and the spring 148 is thereby released for action and serves to move the frame rapidly to the left. This movement of the frame effects the release of the cam 138 which cam is thereby free to rotate throughout 180° and will be again held from rotation with the abutment plate 154 of said frame. The continued rotation of the cam 136 thereby effects the rapid movement of said frame 140 alternately in opposite directions at fifteen minute intervals whereby alternately to release and, after a two-second interval, to engage with the cam 138 and thereby to effect the operation of the clutch at the expiration of every fifteen minute interval. The disengagement of the clutch permits the return of the actuating arm 58 for the indicating hand 56 which hand, however, is frictionally retained in its most advanced position, until reset manually.

The structure may be otherwise modified without departing from the spirit of the invention.

I claim:

1. A gas meter having an enclosing casing, internally-contained metering mechanism having an exposed shaft, a maximum demand metering mechanism disposed externally of said casing and having a shaft which has a detachable connection with said exposed shaft which is disconnectible by movement of said demand mechanism axially of said shaft, and a casing enclosing said maximum demand metering mechanism and also enclosing said exposed shaft, said casing having a front opening, a removable closure therefor and means detachably securing said casing to said gas meter casing and accessible only through the aforesaid front opening when the closure therefor is removed.

2. Maximum demand gas metering mechanism including an indicating hand adapted to remain in any position in which it may be moved, operating mechanism adapted to move said hand in one direction only including a driven shaft having a member arranged to bear against said hand and adapted to be rotated out of its initial position to advance said hand, a continuously-rotatable drive shaft for said driven shaft and in line therewith, time-controlled clutch mechanism arranged periodically to disconnect said driven shaft and drive-shaft, means to return said free driven shaft to its initial position free of said hand and a gas metering mechanism including a metering shaft having a disconnectible connection with said drive shaft.

3. Maximum demand gas metering mechanism including a maximum demand indicating device, operating mechanism for said device including a member adapted to be rotated away from an initial position to operate said indicating device and having means to return it to its initial position free from said device, a continuously-rotatable drive shaft for said member, clutch-mechanism connecting said rotatable member and drive shaft, a rotary member for operating said clutch-mechanism, time-controlled means to control the time-period of clutched condition of said clutch-mechanism having means periodically to release said rotary member for independent rotation, and timing means to control the rotary movement of said rotary member.

4. Maximum demand gas metering mechanism including an indicating device, a drive shaft therefor, a disconnectible connection between said device and drive shaft, time-controlled means to govern the time period of connection between said device and shaft, and independently acting means to control the period of disconnection between said device and shaft.

5. Maximum demand gas metering mechanism including an indicating device which remains indefinitely in any position in which it may be moved, a continuously-rotatable drive shaft having an extension which has a one way driving connection with said device, a continuously-rotatable gas metering shaft which drives said drive shaft timing mechanism including a continuously-rotatable member, and intermittently-operable clutch mechanism governed by said continuously-rotatable member and arranged periodically to make and break the driving connection between said indicating device and drive shaft.

6. Maximum demand metering mechanism including an indicating device, a drive shaft therefor, clutch-mechanism controlling the connection between said indicating device and drive shaft, and intermittently-operated operating mechanism for said clutch-mechanism including a clutch-actuating member normally biased for operation, latching mechanism normally restraining said member from operation, and time-controlled mechanism to release said latching mechanism.

7. Maximum demand metering mechanism including an indicating device, a drive shaft therefor, clutch-mechanism controlling the connection between said indicating device and drive shaft, and intermittently-operated operating mechanism for said clutch-mechanism including a clutch-actuating member, a normally-stressed spring arranged to bias said clutch-actuating member for operation, and actuating mechanism for said clutch-actuating member including means to wind said spring between clutch-operations.

8. Maximum demand metering mechanism including an indicating device, a drive haft therefor, clutch-mechanism controlling the connection between said indicating device and drive shaft, and intermittently-operated operating mechanism for said clutch-mechanism including a clutch-actuating member, driving means for said clutch-actuating member, and holding and releasing mechanism governing the operation of said clutch-actuating member.

9. Maximum demand metering mechanism including an indicating device, a drive shaft therefor, clutch-mechanism controlling the connection between said indicating device and drive shaft, and intermittently-operated operating mechanism for said clutch-mechanism including a rotatable clutch-actuating member, a normally-stressed spiral spring arranged to bias said clutch-actuating member for operation, and restraining means for said clutch-actuating member arranged to release it for operation including means to wind said spring during inoperative periods of said clutch-actuating member.

10. Maximum demand metering mechanism including an indicating device, a continuously-rotatable drive shaft therefor, clutch-mechanism controlling the connection between said indicating device and drive shaft, and clutch-actuating mechanism including a clutch-actuating member, a continuously-rotatable control shaft therefor, and latching and releasing mechanism for said clutch-actuating member controlled by said control shaft.

11. Maximum demand metering mechanism including an indicating device, a continuously-rotatable drive shaft therefor, clutch-mechanism controlling the connection between said indicating device and drive shaft, and clutch-actuating mechanism including a rotatable clutch-actuating member, spring-mechanism for operating said clutch-actuating member including a continuously-operable winding shaft for the spring, and holding and releasing mechanism for said clutch-actuating member controlled by said winding shaft.

12. Maximum demand metering mechanism including an indicating device, a drive shaft therefor, clutch-mechanism controlling the connection between said indicating device and drive shaft, a clutch-actuating device, driving means for said clutch-actuating device, a latching mechanism arranged normally to hold said clutch-actuating device from operation, and means to control the holding and releasing of said latching mechanism.

13. Maximum demand metering mechanism including an indicating device, a drive shaft therefor, clutch-mechanism controlling the connection between said indicating device and drive shaft, a clutch-actuating device, driving means for said clutch-actuating device, a latching mechanism arranged normally to hold said clutch-actuating device from operation, and other time-controlled latching-mechanism to control the holding and releasing of said first-named latching mechanism.

14. Maximum demand metering mechanism including an indicating device, a drive shaft therefor, clutch-mechanism controlling the connection between said indicating device and drive shaft, a clutch-actuating device, including a rotatable drum, driving means for said drum, a stepped-cam rotatable with said drum, a rotatable control shaft, and mechanism governed by said control shaft to alternately release and engage the step of said cam.

15. Maximum demand metering mechanism including an indicating device, a drive shaft therefor, clutch-mechanism controlling the connection between said indicating device and drive shaft, a clutch-actuating device including a rotatable drum, driving means for said drum, a stepped cam rotatable with said drum, a reciprocable cam-frame having abutment-members disposed on opposite sides of said cam and arranged alternately to engage with the step of said cam, and means to reciprocate said cam-frame.

16. Maximum demand metering mechanism including an indicating device, a drive shaft therefor, clutch-mechanism controlling the connection between said indicating device and drive shaft, a clutch-actuating device including a rotatable drum, driving means for said drum, a stepped cam rotatable with said drum, a reciprocable cam-frame having abutment-members disposed on opposite sides of said cam and arranged alternately to engage with the step of said cam, means to reciprocate said cam-frame including a continuously-rotatable stepped cam disposed within said frame, abutment members carried by said frame on opposite sides of said latter cam, and alternately-stressed spring-means arranged to move said cam-frame alternately in opposite directions.

17. Maximum demand metering mechanism including an indicating device, a drive shaft therefor, clutch-mechanism controlling the connection between said indicating device and drive shaft, a clutch-actuating device including a rotatable drum, driving means for said drum, a stepped cam rotatable with said drum, a reciprocable cam-frame having abutment-members disposed on opposite sides of said cam and arranged alternately to engage with the step of said cam, means to reciprocate said cam-frame including resilient members connected with said frame to urge it in opposite directions, and means to stress said resilient members alternately and in opposite directions.

18. Maximum demand metering mechanism including an indicating device, a drive shaft therefor clutch-mechanism controlling the connection between said indicating device and drive shaft, a clutch-actuating device, including a rotatable drum, driving means for said drum, a stepped cam rotatable with said drum, a reciprocable cam-frame having abutment-members disposed on opposite sides of said cam and arranged alternately to engage with the step of said cam, means to reciprocate said cam-frame including resilient members connected with said frame to urge it in opposite directions, means to stress said resilient members alternately and in opposite directions, and cam-controlled means to hold said frame releasingly against the action of said resilient members.

19. Maximum demand metering mechanism including an indicating device, a drive shaft therefor, clutch-mechanism controlling the connection between said indicating device and said drive shaft including a rotatable drum, driving means for said drum, holding and releasing means for said drum including a stepped cam rotatable with said drum, a reciprocable cam-frame surrounding said cam and having a pair of opposed shoulders disposed on opposite sides of said cam and arranged alternately to engage and release the step thereof, means to reciprocate said cam-frame including a crank-shaft extended through said frame, springs connected with the opposite ends of said frame and extended inwardly and having a connection with the crank of said crank shaft, and holding and releasing means for said cam-frame including a stepped cam fixed to said crank-shaft and disposed within said cam-frame, said cam-frame having opposed shoulders disposed on opposite sides of said cam which are adapted normally to be engaged by said cam to hold said frame against movement, the step of said cam arranged to ride alternately over the edges of said shoulders whereby suddenly to release said frame for movement under the action of said springs, the movement of said frame serving to release said first cam for rotation.

20. Maximum demand metering mechanism including a rotatable indicating hand adapted to remain in any position to which it may be moved, a driving member for said hand adapted to be rotated from an initial position in driving engagement with said hand, means to return said driving member to its initial position independently of said hand, a continuously rotatable drive shaft for said driving member, clutch-mechanism connecting said driving member and said drive shaft, actuating mechanism for said clutch-mechanism including a pivoted actuating lever, a cam-drum for operating said lever, driving means for said drum, timing mechanism arranged to govern the speed of operation of said cam-drum, holding and releasing mechanism for said cam-drum including a stepped cam fixed to said cam-drum, a swinging cam-frame surrounding said drum and having a set of opposed shoulders arranged alternately to engage and release the step of said cam, means to reciprocate said cam-frame including a continuously-rotatable crank shaft extended into said cam-frame, speed-controlled driving mechanism of said crank-shaft, springs connected with opposite sides of said cam frame extended toward each other and having connections with the crank of said crank shaft and arranged alternately to be stressed by said crank shaft and thereby urge said cam-frame for movement alternately in opposite directions, and holding and releasing means for said cam frame including a stepped cam disposed within said cam-frame, said cam-frame having a second set of opposed shoulders arranged normally to be engaged by said cam to hold said frame from movement, the step of said cam arranged to ride over the edges of said shoulders alternately, whereby suddenly to release said frame for movement under the urge of said springs, and the movement of said cam-frame serving to release said first stepped cam.

21. Maximum demand metering mechanism including an indicating device, a continuously-rotatable drive shaft therefor, clutch-mechanism connecting said indicating device with said drive shaft, means including timing mechanism arranged to unclutch said clutch-mechanism periodically at the expiration of predetermined time-periods, and means including other timing mechanism arranged to hold said clutch-mechanism in unclutched condition for predetermined time-periods.

22. Maximum demand gas metering mechanism including the combination of a gas meter casing having metering mechanism and a metering shaft therein, and a maximum demand mechanism casing attached removably to said meter casing and having a driving shaft which has a detachable connection with said metering shaft, a driven shaft, a clutch mechanism connecting said driving and driven shafts, means for returning said driven shaft to a normal position when the clutch is disengaged, an indicating hand movable by said driven shaft and adapted to remain in any moved position, and time-controlled mechanism for effecting the alternate and periodical engagement and release of said clutch mechanism.

23. Maximum demand gas metering mechanism including the combination of a gas metering mechanism having a gas metering shaft, metering mechanism driven thereby, a driving shaft having a disconnectible driving connection with said metering shaft, a driven shaft, means rotatably supporting said driving and driven shafts in constant fixed relation with each other, a friction clutch connecting said driving and driven shafts including cooperating friction elements carried respectively by said driving and driven shafts, an operating member for disengaging said friction elements by movement axially of said driving shaft, an indicator movable by said driven shaft and adapted to remain in any set position free of said driven shaft, means for moving said unclutched driven shaft away from said indicator, and time-controlled mechanism for periodically actuating said clutch operating member to disconnect and connect said driving shafts.

In testimony whereof, I have signed my name to this specification.

HANS VITTINGHOFF.